(12) United States Patent
Peng (10) Patent No.: US 9,757,686 B2
(45) Date of Patent: Sep. 12, 2017

(54) SHIP FLUE GAS SCRUBBING APPARATUS AND METHOD

(71) Applicant: Sigan Peng, Wuhan (CN)

(72) Inventor: Sigan Peng, Wuhan (CN)

(*) Notice: Subject to any disclaimer, the term of this patent is extended or adjusted under 35 U.S.C. 154(b) by 728 days.

(21) Appl. No.: 13/958,727

(22) Filed: Aug. 5, 2013

(65) Prior Publication Data
US 2013/0315811 A1    Nov. 28, 2013

Related U.S. Application Data

(63) Continuation-in-part of application No. 12/304,751, filed as application No. PCT/CN2008/071304 on Jun. 13, 2008, now Pat. No. 8,500,893.

(51) Int. Cl.
*B01D 53/50* (2006.01)
*B01D 53/92* (2006.01)

(52) U.S. Cl.
CPC ........ *B01D 53/504* (2013.01); *B01D 53/92* (2013.01); *B01D 2252/1035* (2013.01); *B01D 2257/302* (2013.01); *B01D 2258/012* (2013.01); *B01D 2259/4566* (2013.01)

(58) Field of Classification Search
None
See application file for complete search history.

(56) References Cited

U.S. PATENT DOCUMENTS

| 3,285,711 A | 11/1966 | Stanford |
| 3,389,829 A * | 6/1968 | Stanford ............... B65D 90/44 169/45 |
| 3,733,777 A | 5/1973 | Huntington |
| 3,781,407 A | 12/1973 | Kamijo et al. |
| 3,785,121 A | 1/1974 | Phelps |
| 3,899,099 A | 8/1975 | Oiestad |
| 3,929,434 A | 12/1975 | Nelson |
| 4,085,194 A | 4/1978 | Otani et al. |
| 4,197,278 A | 4/1980 | Gehri et al. |
| 4,337,230 A | 6/1982 | Ellestad et al. |

(Continued)

FOREIGN PATENT DOCUMENTS

| CN | 2220590 Y | 2/1996 |
| CN | 2346494 Y | 11/1999 |

(Continued)

OTHER PUBLICATIONS

Translation of DE19751851A1.*

(Continued)

*Primary Examiner* — Amber R Orlando
*Assistant Examiner* — Phillip Shao
(74) *Attorney, Agent, or Firm* — Heslin Rothenberg Farley & Mesiti P.C.

(57) ABSTRACT

A ship flue gas scrubbing apparatus and scrubbing method are provided. The apparatus includes a housing, an upper scrubbing layer at the upper side inside the housing, and a liquid collecting pool in the lower side inside the housing, a flue gas leading-in port between the scrubbing layer and the liquid collecting pool, a scrubbing seawater inlet above the scrubbing layer, and a cooler located at a flue gas passage between the flue gas inlet outside the housing and the scrubbing layer. The method includes leading flue gas, cooling, injecting scrubbing seawater, scrubbing and other steps.

8 Claims, 5 Drawing Sheets

(56) References Cited

U.S. PATENT DOCUMENTS

| | | | |
|---|---|---|---|
| 4,455,339 A | 6/1984 | Meier | |
| 4,999,172 A | 3/1991 | Simons | |
| 5,316,737 A | 5/1994 | Skelley et al. | |
| 5,558,818 A | 9/1996 | Gohara et al. | |
| 5,690,899 A | 11/1997 | Makkinejad et al. | |
| 6,214,065 B1 | 4/2001 | Berg | |
| 6,217,839 B1 | 4/2001 | Hess et al. | |
| 6,284,208 B1 | 9/2001 | Thomassen | |
| 6,402,816 B1 | 6/2002 | Trivett et al. | |
| 6,726,748 B2 | 4/2004 | Goode et al. | |
| 7,056,367 B2 | 6/2006 | Trivett | |
| 7,226,572 B1 | 6/2007 | Keller et al. | |
| 2006/0251559 A1 | 11/2006 | Schleicher et al. | |
| 2008/0044335 A1 | 2/2008 | Anttila et al. | |
| 2009/0257932 A1 | 10/2009 | Canari et al. | |

FOREIGN PATENT DOCUMENTS

| | | | |
|---|---|---|---|
| CN | 1236663 A | 12/1999 | |
| CN | 2431943 Y | 5/2001 | |
| CN | 2569893 Y | 9/2003 | |
| CN | 101104130 A | 1/2008 | |
| CN | 200710012371.1 | 1/2008 | |
| CN | 101288823 A | 10/2008 | |
| DE | 19751851 A1 * | 5/1999 | ............ B01D 47/14 |
| EP | 1857169 A1 | 11/2007 | |
| GB | EP 1797943 A1 * | 6/2007 | ............ B01D 53/18 |
| JP | 63-256117 A | 10/1988 | |
| JP | 07-185305 A | 7/1995 | |
| JP | 2007-222763 A | 9/2007 | |
| JP | 2007-263078 A | 10/2007 | |
| WO | 92/08541 A1 | 5/1992 | |
| WO | 99/44722 A1 | 9/1999 | |
| WO | 2006/018911 A1 | 2/2006 | |
| WO | 2008/029397 A1 | 3/2008 | |
| WO | 2008/029398 A1 | 3/2008 | |
| WO | 2009/149602 A1 | 12/2009 | |
| WO | 2009/149603 A1 | 12/2009 | |

OTHER PUBLICATIONS

I Dr. Ida-Maja Karle, et al., "Seawater Scrubbing—Reduction of Sox Emissions from Ship Exhausts," The Alliance for Global Sustainability, Goteborg 2007, ISBN: 978-91-976534-1-1.

International Search Report for International Application No. PCT/CN2008/071304, dated Mar. 19, 2009.

* cited by examiner

PRIOR ART

SHIP FLUE GAS SCRUBBING APPARATUS AND METHOD

CROSS-REFERENCE TO RELATED APPLICATION

This application is a continuation-in-part of U.S. patent application Ser. No. 12/304,751, a national phase application of PCT/CN2008/071304 filed Jun. 13, 2008, incorporated herein by reference.

FIELD OF THE INVENTION

This invention relates to a ship flue gas scrubbing apparatus and scrubbing method, in which seawater is used to scrub and reduce pollutant discharge, mainly sulfur dioxide, from marine shipping. It belongs to the technical fields of atmospheric environmental protection and flue gas pollution prevention and control for the marine shipping.

DESCRIPTION OF RELATED ART

In the past 20 years, international legislations about the reduction of gaseous pollutants, mainly the sulfur dioxide, discharged from facilities of emission-reduction industries are getting stricter and more mature. In recent years the targets of restriction have been extended from land-based industrial facilities to sea-based shipping.

After the sulfur dioxide reduction issue was brought out world widely, a trend appeared soon to pay great attention the flue gas desulphurization (FGD) technologies with seawater. In 2007, a research report from an allied institution of four internationally well-known universities clearly expressed that: using the ocean resources, i.e., the seawater, to realize the $SO_2$ emission reduction in ships is again an expectation that people have been pursuing for a long time but has not been realized.

The research report from the allied institution of Massachusetts Institute of Technology, University of Tokyo, Chalmers University of Technology, and Swiss Federal Institute of Technology Zurich is entitled "Seawater scrubbing-reduction of $SO_X$ emissions from ship exhausts" (ISBN: 978-91-976534-1-1), and the research report concluded that "seawater scrubbing is a promising technology for reducing sulfur oxide emissions from ships . . . would therefore require detailed case studying . . . Further research would be needed to reach a conclusion".

Compared to the emission reduction in the land-based coal-fired industrial facilities, in the situation of flue gas treatment for sea-based shipping with a flue gas temperature as high as 200° C. to 490° C., the FGD processing apparatus specially used in ships must be evaluated for its practicality, with more emphasis on profitability. That is, the total cost of ship FGD apparatus must be significantly lower than the total cost saved by substituting low-sulfur fuels, otherwise, the apparatus is not practical. A number of problems on profitability and efficiency in the prior art have not been solved.

Prior Art 1: a Chinese patent application No. 200710012371.1, entitled "apparatus and method for treating ship exhausts by seawater scrubbing", published on Jan. 16, 2008. The technical solution is that in a hollow fiber membrane contactor used as a scrubber, the ship exhaust after dust removal pretreatment is scrubbed with seawater. A control system composed of a $SO_2$ consistency monitor, a water quality monitor and a PLC programming controller detects and records in real time the $SO_2$ concentration and water discharge quality in the processed ship exhaust, and controls the water discharge. There exist the following problems:

1) In the technical solution a hollow fiber membrane contactor is used to realize the scrubbing function. However, the hollow fiber membrane can only tolerate tens of centigrade in temperature, and cannot be used for processing flue gas discharged from ship engines with a temperature as high as 200-490° C.
2) The pressure drop and resistance are very large if in the scrubber a hollow fiber membrane contactor is used for scrubbing. If an additional booster fan is installed, the operation cost and energy consumption would be quite high.

Prior Art 2: U.S. Pat. No. 7,056,367 issued on Jun. 6, 2006, entitled "Method and apparatus for scrubbing gases, using mixing vanes". This invention discloses a scrubber for exhaust gas composed of a series of nested counter-flow passages including a hot plenum having a star-shaped section. The Exhaust gas from the hot plenum surges through a liquid bath and flows in a reverse direction through an inclined array of flat, overlapping, spaced mixing vanes, causing turbulence in the exhaust gas and forming highly dispersed tiny bubbles, which accelerates the entry of gaseous pollutants into the scrubbing liquid. Mist eliminator vanes remove entrained liquids from the exhaust gases. The hot plenum reheats the exhaust gases to an unsaturated level. The scrubbing significantly and effectively reduces particulate matter and the pollutants such as sulfur dioxide and nitrogen dioxide in the exhaust gases, and reduces heat as well. The details are given hereinbelow.

The technical solution of the invented apparatus of U.S. Pat. No. 7,056,367 is a scrubber device for reducing of gaseous particulates and contaminants discharged from industrial facilities, which includes: 1) a co-axial nested inlet conduit, a hot conduit, an outlet conduit, an counter-flow passage of the exhaust gas, and a tank containing a scrubbing liquid; 2) wherein ends of the heat conduit and the outlet conduit are interconnected and immersed in the scrubbing liquid in the tank, whereby the exhaust gas passes through the liquid bath; 3) one or more mixing vanes, and one or more horizontal mist eliminator vanes; 4) said mixing vanes are located inside the immersed end of the outlet conduit, and are adapted to generate a turbulence in the exhaust gas so as to form very small bubbles; 5) said mist eliminator vanes are located downstream of the mixing vanes of the outlet conduit, so as to remove mist droplets from the exhaust gas.

The technical solution of the invented method of U.S. Pat. No. 7,056,367 is a method of scrubbing the exhaust gas to reduce particulates and gaseous contaminants and to decrease the temperature in the exhaust gas, which comprises: a) passing the exhaust gas through an extended inlet conduit; b) passing the exhaust gas in a counter-flow direction through a heat conduit surrounding the inlet conduit; c) passing the exhaust gas through a liquid bath for scrubbing, cooling, and for precipitation of the particulate matter; d) passing the exhaust gas in a counter-flow direction into an outlet conduit surrounding the heat conduit and having share a length of the wall with the heat conduit; e) passing the exhaust gas through one or more mixing vanes so as to change the direction of the gas, whereby generating a turbulence in the liquid bath, and creating (numerous) fine bubbles to form a bubble stream; f) passing the exhaust gas through one or more mist eliminator vanes to substantially eliminate any entrained bubbles or moisture; g) passing the exhaust gas along a heated surface of the shared wall to heat the exhaust gas to a temperature above the dew point; and h) completely discharging the exhaust gas from the scrubber.

The major objects of above invented method and apparatus of the prior art are as follows:
1) scrubbing $SO_2$ with high efficiency, and at the same time to keep the operating pressure loss less than six inches of water column;
2) increasing the temperature of the discharged exhaust gas to at least 30° C. above the dew point.

Using seawater scrubbing to reduce the sulfur dioxide and other pollutants in the exhaust gas mainly relies on some important conditions. One of the conditions is the temperature, and the higher the temperature, the worse the scrubbing effect. Another condition is the gas-liquid contact area, and the larger the contact area, the better the scrubbing effect. The basic technical solution in U.S. Pat. No. 7,056,367 is "passing the exhaust gas through the scrubbing liquid in the tank", i.e., bubbling scrubbing in which the high temperature exhaust gas is scrubbed and cooled, and the gas-liquid contact surface is enlarged by "mixed vanes". The "passing exhaust gases through the scrubbing liquid in the tank" in the invention is the technical solution of bubbling scrubbing, which has the following shortcomings when used for scrubbing the high temperature exhaust gas of ship by seawater.
1) It is Difficult to Overcome the Conflict between the Scrubbing Effect and the Operational Cost.

The prominent feature of the invention is "passing exhaust gas through the scrubbing liquid in the tank", i.e., the bubbling scrubbing and cooling method. The bubbling scrubbing method is almost has the lowest efficiency in gas-liquid mass-transfer methods. In such technology, the smaller the size of the element which is usually called bubbling hood, i.e., the bubbling unit, and the larger the amount thereof, the higher the transfer efficiency (see FIG. 4). However, the mentioned invention, being limited by the conditions in the ship for exhaust gas scrubbing, employs a single bubbling hood of a large size, which has a very low mass-transfer efficiency. On the other hand, scrubbing or absorbing level of the bubbling scrubbing method directly relates to the depth of exhaust immersed in the liquid. The deeper in the liquid, the more the bubbles. Also the longer the path passed by the bubbles to leave the liquid, and the larger the gas-liquid contact area, the higher the scrubbing rate or absorptivity. The pressure loss of the bubbling scrubbing operation is the energy loss of the exhaust to overcome the liquid pressure, and in value substantially corresponds to the liquid column pressure based on the depth of the exhaust gas immersed in the liquid. That is, the better the scrubbing performs better, the more the increase of the pressure loss, and the higher the operational cost. The conflict between the scrubbing effect and the operational cost is generally irreconcilable.

The technical solution of the patent requires a running pressure loss to be lower than 6 inches (152 mm) of water column under the condition of using the seawater as the scrubbing liquid, and obviously, the depth of the exhaust gas in the scrubbing liquid is also less than 6 inches. With such a shallow immerse, the overall liquid-gas contact area is still extremely limited even if the 'mixed vanes' is added as additional technical means to form a turbulence and to disperse bubbles. As a result, the scrubbing and absorbing efficiency is still very low. In order to reach a much better scrubbing performance, the exhaust immersion depth and the pressure loss shall be increased, hence the energy consumption and the operational cost would rise accordingly. This obviously will not bring a good result.

2) It is Difficult to Overcome the Conflict between Cooling of the High Temperature Flue Gas and Absorbing Sulfur Dioxide at a Low Temperature.

The major purpose of scrubbing the flue gas with the seawater is to absorb the sulfur dioxide. This solution of the invention employs the same tank of water to carry out the cooling, scrubbing and absorbing processes for the high temperature gas. The temperature of the scrubbing seawater increases while the high temperature gas is cooled, and simultaneously, the heated seawater is used for scrubbing and absorbing the sulfur dioxide. This causes the sulfur dioxide absorbing to be inefficient. In order to increase the absorbing efficiency, the only way is to add more scrubbing water to lower the increase of temperature of the scrubbing seawater. However, this will significantly increases the energy consumption and the operational cost, and cannot solve both at the same time.

3) It is Difficult to Overcome the Conflict between Decreasing of the Running Cost with Anticorrosive Elements and Increasing of the Manufacturing Cost.

Another feature of this invention is that it adopts a nested heat exchanger of the "heat conduit" type, i.e., "passing the exhaust gas along a heated surface of the shared wall to raise the temperature of the exhaust gas to be above the dew point". The technical solution is adopted which increases the temperature of the exhaust gas so as to prevent the corrosion of the apparatus, so as to decrease the operational cost and extend the operational life of the apparatus. However, the heat conduit must have a cross-section of a star-shape or other complicated shape so as to increase the heat conduct area, and to re-heat the exhaust gas with more heat. Because the heat exchanger has to work in a condition of high-temperature, high-humidity, and a strongly corrosive environment and has a complicated structure, it needs a large quantity of corrosion resistant alloy materials, and this would certainly increase the manufacturing cost of the apparatus, and the total cost would rise accordingly, and this outweighs the benefits.

4) It is Difficult to Overcome the Conflict between the Corrosion Prevention and the Corrosion Aggravation in the Gas Re-heating.

The invention adopts a nested heat exchanger of the "heat conduit" type under the condition of scrubbing the ship exhaust gas with seawater. The real temperature of the reheated exhaust will not only be not higher than the acid dew point by 30° C., but also be significantly lower than the dew point. The problem is that in the range of the temperature not higher than the dew point, the corrosion gets more serious when the exhaust temperature is higher. The purpose of this technical solution of this invention is to prevent the corrosion, but the re-heating method for increasing the exhaust temperature may only aggravate the corrosion. The result seems against the inventive purpose.

The invention has been experimented on ships for many years.

Clearly, to solve the problem in processing the exhaust gas of high temperature at 200-400° C. from the marine ship engines, methods and apparatuses of low efficiency and high cost have been adopted in the prior art. On the basis of the current situation as described above, the technical principle of using seawater scrubbing to eliminate ship pollution, as expected by people for a long time, has not become a practical technical solution.

SUMMARY OF THE INVENTION

The first object of the present invention is to overcome the shortcomings in the existing ship flue gas scrubbing apparatus, and to provide a highly efficient ship flue gas scrubbing apparatus adapted for ships with a high gas temperature gas and a limited space.

The second object of the present invention is to overcome the shortcomings in the existing ship flue gas scrubbing methods, and to provide a ship flue gas scrubbing method in which the high temperature exhaust gas is cooled first and then scrubbing by fillings is performed, whereby the cooling and scrubbing are separated into two steps to respectively achieve the best results.

The common object of the ship flue gas scrubbing apparatus and method in the present invention is to realize the good technical and economic goals, which include a high pollutant reduction efficiency, a low running cost, a long lifespan, and a guarantee that the total cost is significantly lower than the total cost saved by substituting low-sulfur fuels.

The technical solution of the ship flue gas scrubbing apparatus of the present invention is as follow. It comprises a housing, a scrubbing layer having fillings is fixed within the housing at an upper part of the housing. A liquid collecting pool with a seawater discharging outlet is provided within the housing at a lower part of the housing. A flue gas leading pipe, which guides flue gas to be scrubbed from the outside of the housing into the inside of the housing, is connected to a wall of the housing. One end of the flue gas leading pipe is a flue gas inlet located outside the housing. The other end of the flue gas leading pipe is a flue gas leading-in port located inside the housing. The flue gas leading-in port is located at an inner wall of the housing or extends into the housing, and is located between the scrubbing layer and the liquid collecting pool. A cooler for cooling high temperature flue gas is provided in a flue gas passage between the flue gas inlet outside the housing of the flue gas leading pipe and the scrubbing layer. A scrubbing seawater inlet is above the scrubbing layer. A clean gas outlet is provided at the top of the housing.

Based on the technical resolution of the ship FGD device as described above, technical resolutions with additional features are as follows.

In the ship flue gas scrubbing apparatus, the cooler is a cooling flow equalization layer provided between the gas leading-in port inside the housing and the scrubbing layer. The cooling flow equalization layer is composed of high temperature resistant components and is fixed, or installed by means of fasteners, on the inner wall of the housing.

In the ship flue gas scrubbing apparatus, the cooler is a tube cooler or a sheet cooler installed on the flue gas leading pipe or in a cavity inside the pipe. Alternatively, the cooler is a spray system connected to the flue gas leading pipe or on the housing, for spraying cooling water to the high temperature flue gas.

In the ship flue gas scrubbing apparatus, the gas leading-in port inside the housing is an exit of the flue gas leading pipe fixed at the bottom of the housing and extending to the inside of the housing. Facing the exit is a liquid collecting cover for preventing the scrubbing seawater from entering the flue gas leading pipe.

In the ship flue gas scrubbing apparatus, the gas leading-in port inside the housing is a through hole in the side wall of the housing, or an exit of the flue gas leading pipe fixedly connected to the side wall of the housing.

In the ship flue gas scrubbing apparatus, the liquid collecting pool is fixedly composed of a lower side wall of the housing, a bottom of the housing, and a pipe wall of the flue gas leading pipe or a separation plate outside the pipe wall.

In the ship flue gas scrubbing apparatus, the liquid collecting pool is composed of the side wall and the bottom of the housing under a horizontal cross section where a lower edge of the flue gas leading-in port inside the housing lies.

In the ship flue gas scrubbing apparatus, the material of the high temperature resistance components forming the cooling flow equalization layer is a high temperature resistant inorganic material selected from metal, ceramics or carbon fiber materials.

In the ship flue gas scrubbing apparatus, the cooling flow equalization layer includes high temperature resistant fillings and a filling supporting frame. The supporting frame for the high temperature resistant fillings is fixed on the inner wall of the housing directly or through fasteners.

In the ship flue gas scrubbing apparatus, the cooling flow equalization layer includes a high temperature resistant grid or/and a high temperature resistant perforated plate, which is fixed on the wall of the housing directly or through fasteners.

In the ship flue gas scrubbing apparatus, the scrubbing layer includes fillings and a filling supporting frame. The filling supporting frame is fixed on the inner wall of the housing directly or through fasteners.

In the ship flue gas scrubbing apparatus, the fillings in the scrubbing layer is of a polymer material selected from polypropylene, polyethylene, or ABS engineering plastics.

In the ship flue gas scrubbing apparatus, a water distributor which outflows downwards the scrubbing seawater in a horizontal and even distribution pattern is fixed above the scrubber layer. The water distributor is composed of aligned water pipes or/and water channels.

In the ship flue gas scrubbing apparatus, a mist eliminator 9 for eliminating mist drops in the exhaust gas is installed above the water distributor.

The technical solution of the ship flue gas scrubbing method of the present invention for scrubbing, by means of seawater, the pollutants, mainly sulfur dioxide in the flue gas discharged from ships is as following.

The steps of the ship flue gas scrubbing method are as follows:

a. leading in flue gas: flue gas discharged by an engine is led into a scrubber, and the leaded-in flue gas is caused to flow upwards in the scrubber;

b. injecting scrubbing seawater: the scrubbing seawater is injected into the scrubber from a scrubbing seawater entrance located above a scrubbing layer of the scrubber, and the scrubbing seawater is caused to flow downwards in the scrubber;

c. scrubbing: scrubbing in a counter-flow way is realized by flowing the scrubbing seawater, which is injected from above the scrubber, through a scrubbing layer with fillings to contact low temperature flue gas that goes upwards;

d. cooling: high temperature flue gas is cooled by a cooler. The scrubbing seawater flows downward through the cooler to reduce the temperature of the high temperature flue gas, then the cooled flue gas goes upwards to enter the scrubbing layer;

e. discharging clean flue gas: after being scrubbed, clean gas goes upwards and is discharged via a cleaned flue gas outlet;

f. discharging the scrubbing seawater: after being scrubbed, the seawater falls into a liquid collecting pool and is discharged from a seawater discharging outlet.

Based on the above technical solution of the ship flue gas scrubbing method, the technical solutions with additional technical features are as follows.

In the ship flue gas scrubbing method, in the scrubbing step, the method of sufficiently scrubbing the low temperature flue gas going upwards is that, in the scrubbing layer, the flue gas and the scrubbing seawater is caused to contact and mix sufficiently at a gas-liquid contact surface of the fillings, and the flue gas going upwards is caused to be sufficiently scrubbed to remove the $SO_2$ therefrom.

In the ship flue gas scrubbing method, in the step of discharging clean flue gas, discharging the clean flue gas is that the clean flue gas is caused to pass through a mist eliminator to eliminate mist drops in the flue gas and then is discharged from the cleaned flue gas outlet.

In the ship flue gas scrubbing method, an operational pressure loss of the flue gas is less than 110 millimeters of water column.

The technical principle and effects of the ship flue gas scrubbing method and apparatus of the present invention are as follows.

Natural seawater possesses strong abilities to dissolve and absorb sulfur dioxide, and can be used to scrub and clean flue gases, so as to eliminate sulfur dioxide and other pollutants in flue gases discharged from industrial combustion facilities. Practical apparatus for scrubbing flue gases with seawater is required to have a small size and a high efficiency. This is because that the ships have a limited space, the reaction time in the processing is short, the processing apparatus must have not only a high total absorptivity but also a high absorbing speed. In other words, the scrubbing and absorbing efficiency must be very high, otherwise the apparatus is not practical. In order for a ship flue gas scrubbing method and apparatus using the seawater to have high scrubbing and absorbing efficiency, the key processing factors are reaction temperature and contact area. That is, the higher the reaction temperature, the worse the scrubbing and absorbing effect, and larger the liquid-gas contact area, the better the scrubbing and absorbing effect. Therefore, the present invention employs the method of first cooling the high temperature flue gas, followed by scrubbing and absorbing, separating the cooling and the scrubbing and absorbing into two functional sections, respectively realizing the highest efficiency, and achieving the best overall effect. The total cost of the ship flue gas scrubbing apparatus and method of the present invention is significantly lower than the total cost saved by substituting the low-sulfur fuel, thereby changing the situation of lacking a practical technology for the ship emission reduction, and realizing the expectation of reducing ship pollution by means of seawater scrubbing, which has been pursued by people for a long time but has not been realized.

The details are as follows.

Cooling: The ship flue gas scrubbing method and apparatus in the present invention can be applied in situations where the flue gas discharged from a ship diesel engine has a temperature as high as 490° C. The sulfur dioxide cannot be scrubbed and absorbed if the flue gas at a high temperature has not been cooled. In addition, the components, especially the fillings in the scrubbing functional section will be easily damaged if the high temperature flue gas enters the scrubbing functional section directly. Therefore, a scrubbing functional section is provided at the upside of the scrubber, and a cooling flow equalization section is provided at the downside of the scrubber. The high temperature gas goes upward to pass the cooling flow equalization section and the scrubbing functional section to contact the scrubbing liquid for being scrubbed. The cooling flow equalization section at the downside of the scrubber is a functional section composed of a high temperature resistant grid or/and fillings.

The high temperature flue gas led in from the gas inlet pipe passes through the grid or/and the fillings in the cooling flow equalization section to be cooled and equalized. The cooling flow equalization section at the downside of the scrubber is a functional section composed of a high temperature resistant perforated plate or/and fillings. The high temperature flue gas led in from the gas inlet pipe passes through the perforated plate or/and the fillings in the cooling flow equalization section to be cooled and equalized. In an implementing solution in which the gas inlet pipe passes through the liquid collecting pool, the portion of the gas inlet pipe immersed in the scrubbing liquid is also a part of the cooling functional section, thus resulting in the best cooling effect.

Scrubbing: The scrubbing functional section is composed of a filling layer. The water distributor distributes downwards the scrubbing seawater evenly from a horizontal plane to wash the fillings. The cooled flue gas flows upwards through the filling layer. Because the scrubbing seawater is distributed at a huge surface formed by the fillings, a huge liquid-gas contact area is provided, whereby the scrubbing and absorbing efficiency is very high. On the other hand, the scrubbing process in the present invention adopts a counter-flow arrangement, in which the scrubbing seawater goes downward through the scrubbing layer while the flue gas goes upward through the scrubbing layer. The flue gas contacts lastly fresh seawater with the strongest alkalinity and the lowest temperature. Thus, the efficiency to scrub and absorb sulfur dioxide can be very high. At the same time, the scrubbing layer with fillings employed in the present inventions invention significantly reduces resistance to the passing gas, thereby ensuring the realization of the object of the present invention to provide a technical apparatus with a high absorbing efficiency and a low operational cost.

As a result of the above-described technical solution, the serious shortcomings in the prior art has been overcome. The ship flue gas scrubbing apparatus and method of the present invention have prominent technical effects as described below.

1) High Scrubbing Efficiency and Low Operational Cost

The present invention adopts the method of counter-flow scrubbing with fillings, and its liquid-gas contact area is at least thousands times of the bubbling scrubbing method. This realizes a high efficient scrubbing which can reduce 99% sulfur oxides, 20% nitrogen oxides, and 80% particles, with a low pressure loss that is less than 110 millimeters of water column.

The high efficient scrubbing of the present invention has significance to international shipping business for the environmental objectives. IMO published in 2005 restrictions for SECA ($SO_x$ Emission Control Area) that the sulfur content of fuel oils used in ships must not exceed 1.5%, or the ships must be equipped with an exhaust gas desulphurization apparatus to ensure that the discharged flue gas has a sulfur emission equal to that in the ships using fuel oils with the sulfur content not exceeding 1.5%, i.e., the 'desulphurization equivalent fuel oil sulfur content' must not exceed 1.5%. Other international organizations have been aiming for a goal of 0.1% fuel oil sulfur content. Currently, the average sulfur content of heavy oils in the world is approximately 3%, so the scrubbing efficiency shall be 50% to achieve the goal of 1.5% desulphurization equivalent fuel oil sulfur content, and the scrubbing efficiency shall be 96.7% to achieve the goal of 0.1% desulphurization equivalent fuel oil sulfur content.

2) Cooling the High Temperature Gas and Absorbing the SO$_2$ at a Low Temperature are Carried out in Different Sections.

The high temperature flue gas must be cooled so that the SO$_2$ in it can be absorbed. The solution of the present invention includes a cooler. A further solution is that the cooling flow equalization layer is disposed below the scrubbing layer, whereby the fresh scrubbing seawater passes through the scrubbing layer to absorb SO$_2$ in the cooled flue gas, and then passes the cooling flow equalization layer to cool the high temperature gas. The cooling flow equalization and absorbing are carried out in two different functional sections in separate steps, and do not have impact on each other. This realizes the best cooling effect and the highest SO$_2$ absorbing efficiency. In addition, as described above, in the counter-flow scrubbing method in the present invention, the seawater at the flue gas outlet has the lowest temperature, and consequently the best absorbing ability. This results in an extremely high SO$_2$ absorptivity, further demonstrating the significant and good technical effects brought by the technical resolution of the present invention in which the cooling and absorbing are carried out in separate steps.

3) The Low Operational Cost and the Low Manufacturing Cost are Reconciled.

The low efficient heat exchanger results in the loss outweighing the gain, which should be avoided. High efficiency heat exchanger requires tremendous thermal capacity and a huge heat conduction area, and thus it may not be installed on ships because of its enormous size. Therefore, the invention adopts the non-reheating gas exhaust, as well as the above-mentioned high efficient filling scrubbing technology. Therefore, the operational cost and the manufacturing cost for the processing apparatus are both reduced considerably.

4) The Conflict between Re-heating Anticorrosion and Corrosion Aggravation is Eliminated.

The present invention adopts the non-reheating gas exhaust and completely omits the re-heating heat exchanger, which effectively overcomes the shortcomings in the existing re-heating heat exchanger for being costly and resulting in a reversed effect. As mentioned above, the flue gas at the counter-flow scrubbing outlet has the lowest temperature, and consequently the corrosion ability of the flue gas is the minimum. Therefore, corrosion resistant materials with less cost can be chosen to extend the lifespan of the apparatus.

To summarize, the technical solution of the present invention not only realizes high efficiency, high performance, and high reliability, but also significantly reduces manufacturing cost and operational cost, and therefore, it has excellent technical and economic performance and good technical effects.

BRIEF DESCRIPTION OF THE DRAWINGS

FIG. 1 is a schematic diagram showing a ship flue gas scrubbing apparatus according to an embodiment of the invention. The flue gas leading-in port 3.2 inside the housing is the exit of a flue gas inlet pipe 3 which is fixed at the bottom of the housing 1 and extends to the inside of the housing 1, and is suitable for the situation that the flue gas goes upward vertically to enter the scrubber. The cooler 4 is a cooling flow equalization layer 4' located between the flue gas leading-in port 3.2 inside the housing and the scrubbing layer 7.

Names of components or structures corresponding to the reference numbers in the drawings are as follows.

Figure 1:
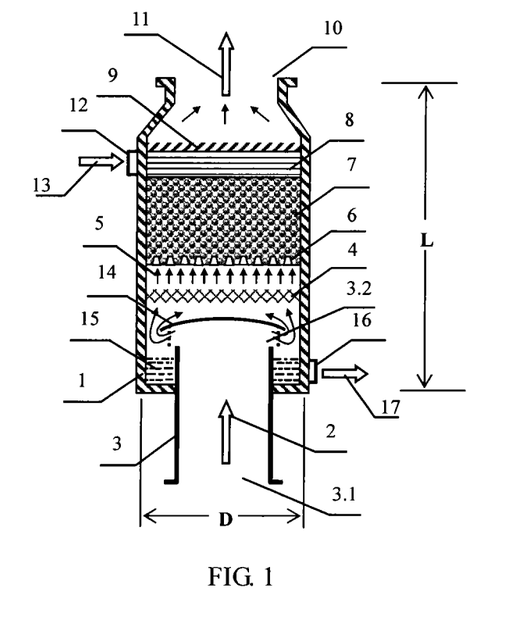
Figure 2:
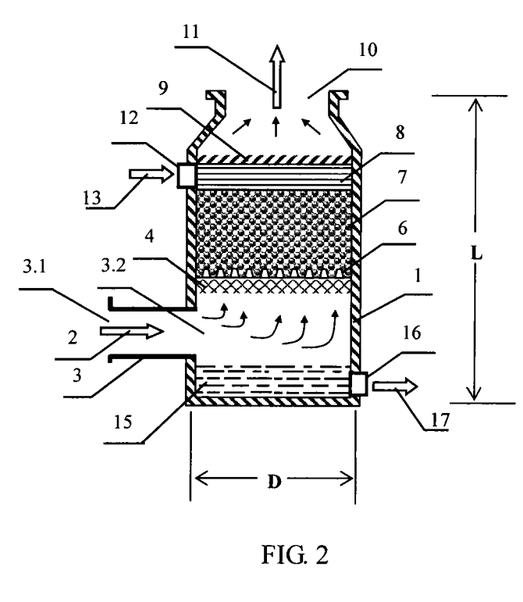
FIG. 2 is a schematic diagram showing a ship flue gas scrubbing apparatus according to another embodiment of the invention. The flue gas leading-in port 3.2 is located at the inner wall of the housing 1, and is the exit of a flue gas leading pipe 3 which is fixedly connected to the side wall of the housing 1. It is suitable for the situation that flue gas enters the scrubber horizontally. The cooler 4 is a cooling flow equalization layer 4' located between the flue gas leading-in port 3.2 inside the housing and the scrubbing layer 7.

In FIG. 1 and FIG. 2: 1—housing, 2—high temperature flue gas, 3—flue gas leading pipe, 3.1—flue gas inlet outside the housing, 3.2—flue gas leading-in port inside the housing, 4—cooler, 4'—cooling flow equalization layer, 5—low temperature flue gas, 6—filling supporting frame, 7—scrubbing layer, 8—water distributor, 9—mist eliminator, 10—exhaust gas outlet, 11—discharging clean flue gas, 12—scrubbing seawater inlet pipe, 13—scrubbing seawater, 14—liquid collecting cover, 15 liquid collecting pool, 16—seawater discharging pipe, 17—discharged seawater; D—the diameter of the scrubber, which is a side length when the scrubber is rectangular; L—the height of the scrubber.

Figure 3:
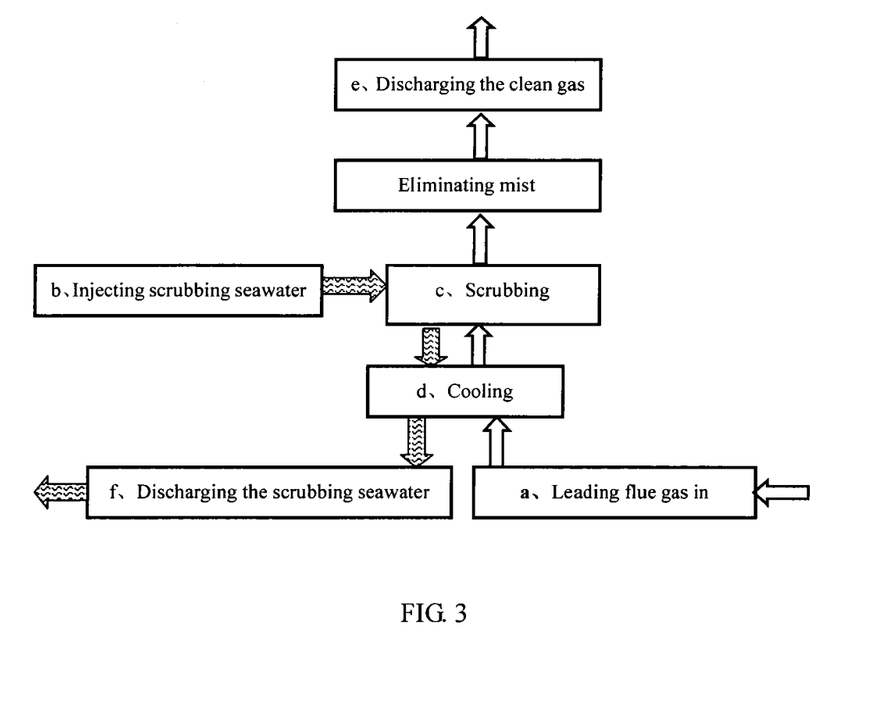
FIG. 3 shows a block diagram of the ship flue gas scrubbing method according to the present invention.

In FIG. 3, a—leading flue gas in, b—injecting scrubbing seawater, c—scrubbing, d—cooling, e—discharging the clean gas, and f—discharging the scrubbing seawater.

Figure 4:
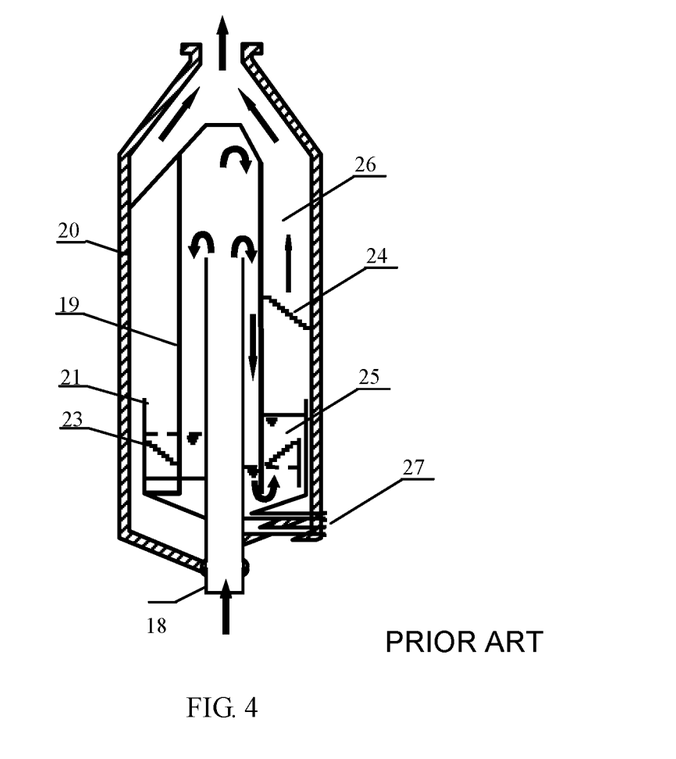
FIG. 4 is a schematic diagram of a prior art technical resolution of the U.S. Pat. No. 7,056,367, which includes an co-axial nested inlet conduit, a hot conduit, an outlet conduit, a counter-flow passing gas exhaust, and a tank containing scrubbing liquid, wherein ends of the heat and outlet conduits are operatively interconnected and immersed in the scrubbing liquid in the tank, and the heat conduit has a star-shaped cross section to increase the heat conduction area, so as to pre-heat the exhaust gases with more heat to increase the temperature of the exhaust gas beyond the dew point by at least 30° C.

In FIG. 4 (the technical resolution of the U.S. Pat. No. 7,056,367), 18—gas inlet conduit and gas inlet; 19—hot conduit; 20—exhaust gas leading pipe; 21—tank containing scrubbing liquid; 22—scrubbing liquid; 23—mixing vanes, 24—mist eliminator vanes, 25—mixing exhaust and scrubbing liquid in the tank, 26—scrubbing gas re-heat area, and 27—scrubbing liquid inlet and outlet.

Figure 5:
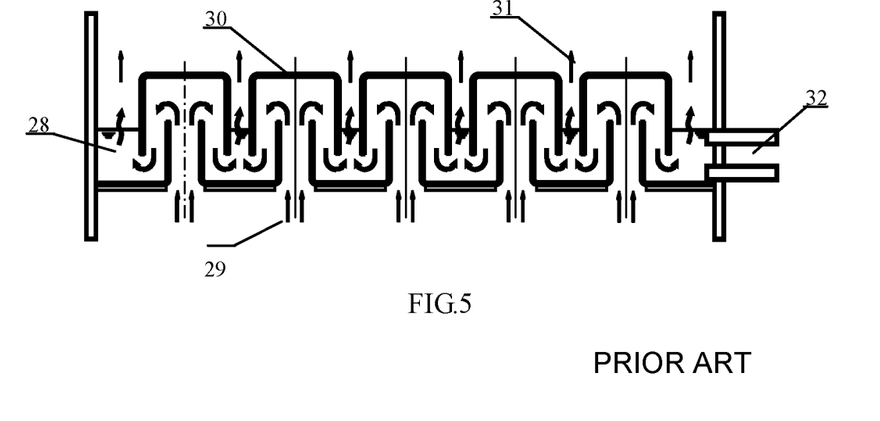
FIG. 5 is a schematic diagram of a conventional bubbling scrubber, and five bubbling units are shown in the apparatus as illustrated.

In FIG. 5 (conventional bubbling scrubber), 28—scrubbing liquid, 29—entering gas, 30—bubbling hood unit, 31—discharging gas, and 32—inlet and outlet of scrubbing liquid.

DETAILED DESCRIPTION OF THE PREFERRED EMBODIMENTS

Further description of the ship flue gas scrubbing apparatus and method are given below with reference to the drawings and embodiments.

A. Embodiments for the Ship Flue Gas Scrubbing Apparatus.

Embodiment 1:

As illustrated in FIG. 1, the flue gas leading-in port 3.2 inside the housing is the exit of the flue gas inlet pipe 3 which is fixed at the bottom of the housing 1 and extends to the inside of the housing 1. In the embodiment, the flue gas leading pipe 3 is always kept above acidic seawater surface in the liquid collecting pool 15, that is to say, the flue gas does not enter the acid seawater. It is suitable for the situation where the flue gas is leaded in vertically. It includes a housing 1. A scrubbing layer 7 with fillings is fixed at the upper side inside the housing. A liquid collecting pool 15 with a seawater outlet 16 is provided at the lower side inside the housing. A flue gas leading pipe 3, which leads the exhaust gas to be scrubbed from the outside into the housing 1, is connected to the housing wall of the housing 1. One end of the flue gas leading pipe 3 is a flue gas inlet 3.1 outside the housing, the other end is the flue gas leading-in port 3.2 inside the housing. The gas leading-in port 3.2 inside the housing extends into the housing 1, and it is located between the scrubbing layer 7 and the liquid collecting pool 15. A cooler 4 used for cooling the high temperature flue gas 2 is provided in the flue gas passage between the flue gas inlet 3.1 outside the housing of the flue gas leading pipe 3 and the scrubbing layer 7. A scrubbing seawater inlet 12 is provided above the scrubbing layer 7. A purified flue gas outlet 10 is provided at the top of the housing 1.

The cooler 4 is a cooling flow equalization layer 4' and is located between the flue gas leading-in port 3.2 inside the housing and the scrubbing layer 7. The cooling flow equalization layer 4' is made up of high temperature resistance components and is fixed on the inner wall of housing 1. Alternatively it can be fixed on the inner wall of housing 1 by means of fasteners.

The cooler 4 is a tube cooler or sheet cooler installed on the flue gas leading pipe 3. In another embodiment, the cooler 4 is a tube cooler or sheet cooler installed in an internal cavity of the flue gas leading pipe 3. In still another embodiment, the cooler 4 is a water spray system connected to the flue gas leading pipe 3 or the housing 1 for spraying cooling water to the high temperature flue gas 2. The water spray system can be a set of spray heads.

The gas leading-in port 3.2 inside the housing 1 is fixed at the bottom of the housing 1 and extends to the exit of the flue gas leading pipe 3 inside the housing 1. a Facing the exit is a liquid collecting cover 14 for preventing the scrubbing seawater from entering the flue gas leading pipe 3.

The gas leading-in port 3.2 inside the housing 1 is a through hole in the side wall of the housing 1, or an exit of the flue gas leading pipe 3 fixedly connected to the side wall of the housing 1.

The liquid collecting pool 15 is composed of the lower side wall of the housing 1, the bottom of the housing 1 and the pipe wall of the flue gas leading pipe 3, or a separation plate outside the flue gas leading pipe 3. The separation plate is able to prevent the pipe wall of the flue gas leading pipe 3 from corrosion.

The high temperature resistant components that make up the cooling flow equalization layer 4' are high temperature resistant inorganic materials. In this embodiment, ceramic material is used, and metal or carbon fiber materials may also be used. The high temperature resistance components of the cooling flow equalization layer 4' are composed of high temperature resistant fillings and a filling supporting frame. The filling supporting frame is directly fixed, or be fixed through fasteners, on the inner wall of the housing 1.

In other embodiments, the cooling flow equalization layer 4' may be a high temperature resistant grid or a high temperature resistant perforated plate, or the combination of both, which can be directly fixed, or be fixed through fasteners, on the inner wall of the housing 1.

The scrubbing layer 7 is composed of fillings and a filling supporting frame. The filling supporting frame is directly fixed, or be fixed through fasteners, on the inner wall of the housing 1. The fillings in the scrubbing layer 7 are of a polymer material select from polypropylene, polyethylene, or ABS. The cost of using non-high temperature resistant materials may be much lower than using high temperature resistant materials, so that the cost of the apparatus is reduced significantly.

Above the scrubbing layer 7 there is a water distributor 8 which can outflow downwards the scrubbing seawater in a horizontal and even distribution pattern. The water distributor 8 is composed of aligned water pipes or aligned water channels, or a combination of both. A mist eliminator 9 for eliminating mist drops in the exhaust gas is installed above the water distributor 8.

The scrubbing liquid finally discharged out of the scrubber would be discharged to the ocean if it meets the environmental emission requirements of the sea area that the ship passes or/and stays, and would be temporarily kept in the waste water cabin or be discharged after further treatment if it does not meet the relevant requirements.

The ship implemented with this embodiment is equipped with a diesel fuel engine of 7150 KW power, 9700 hp, 127 rpm, using fuel oil with sulfur content 3%. The key parameters are as follows:

| | |
|---|---|
| diameter of the scrubber housing (Dmm) | 2523 |
| height of the scrubber housing L(mm) | 8750 |
| Inlet flue gas volume (Kg/h) | 48281 |
| Inlet flue gas temperature ° C. | 200~490 |
| Inlet $SO_2$ volume (Kg/h) | 70 |
| Inlet flue gas and dust volume (g/h) | 245 |
| Inlet NOx volume (g/KWh) | 18.56 |
| Scrubbing seawater volume (Ton/h) | 96 |
| Outlet discharged $SO_2$ volume (Kg/h) | 0.68 |
| Outlet discharged flue gas and dust volume (g/h) | 49 |
| Outlet flue gas temperature ° C. | 20~49 |
| Outlet discharged $NO_x$ volume (g/KW · h) | 14.8 |
| International restrictions of discharged $NO_x$ volume (g/KW · h) | ≤17.0 |

Embodiment 2:

FIG. 2 illustrates a ship flue gas scrubbing apparatus of another embodiment. It is different from Embodiment 1 in that the flue gas leading-in port 3.2 inside the housing 1 is at the inner wall of the housing 1, and it is an exit of the flue gas leading pipe 3 that is fixedly connected on the side wall of the housing 1, which is able to always keeps the flue gas leading pipe 3 above acidic seawater surface in the liquid collecting pool 15. That is to say, the flue gas does not enter the acid seawater. It is suitable for the situation where the flue gas is led in horizontally. The liquid collecting pool 15 is composed of the side wall and the bottom of the housing 1 under the horizontal cross-section where the lower edge of the gas leading-in port 3.2 inside the housing lies.

Embodiment 3:

A ship flue gas scrubbing apparatus of still another embodiment is illustrated. It is different from the previous embodiment in that the cooler 4 is a tube cooler or sheet cooler installed on the flue gas leading pipe 3 or in a cavity inside the pipe.

Embodiment 4:

The difference from the above-described embodiment is in that that the cooler 4 is a water spray system for spraying cooling water to the high temperature gas 2 which is installed on the flue gas leading pipe 3 or it may be connected to the housing 1. The water spray system is a set of spray heads.

B. Ship Flue Gas Scrubbing Method According to Embodiments of the Present Invention Embodiment 5:

As illustrated in FIG. 3 which is a flowchart block diagram, it is a ship flue gas scrubbing method using seawater to scrub pollutants, primarily $SO_2$, in the ship flue gas exhaust. The method includes the following steps.
- a. leading in flue gas: flue gas discharged by an engine is led into a scrubber, and the leaded-in flue gas is caused to flow upwards in the scrubber;
- b. injecting scrubbing seawater: the scrubbing seawater is injected into the scrubber from a scrubbing seawater entrance located above a scrubbing layer of the scrubber, and the scrubbing seawater is caused to flow downwards in the scrubber;
- c. scrubbing: scrubbing in a counter-flow way is realized by flowing the scrubbing seawater, which is injected from above the scrubber, through a scrubbing layer with fillings to contact low temperature flue gas that goes upwards;
- d. cooling: high temperature flue gas is cooled by a cooler. The scrubbing seawater flows downward through the cooler to reduce the temperature of the high temperature flue gas, then the cooled flue gas goes upwards to enter the scrubbing layer;
- e. discharging clean flue gas: after being scrubbed, clean gas goes upwards and is discharged via a cleaned flue gas outlet;
- f. discharging the scrubbing seawater: after being scrubbed, the seawater falls into a liquid collecting pool and is discharged from a seawater discharging outlet.

In the ship flue gas scrubbing method, in the scrubbing step, the method of sufficiently scrubbing the low temperature flue gas going upwards is that, in the scrubbing layer, the flue gas and the scrubbing seawater is caused to contact and mix sufficiently at a gas-liquid contact surface of the fillings, and the flue gas going upwards is caused to be sufficiently scrubbed to remove the $SO_2$ therefrom. In the step of discharging clean flue gas, discharging the clean flue gas is that the clean flue gas is caused to pass through a mist eliminator to eliminate mist drops in the flue gas and then is discharged from the cleaned flue gas outlet. An operational pressure loss of the flue gas is less than 110 millimeters of water column.

The protection range of this invention is not limited by the embodiments described above.

The invention claimed is:

1. A ship flue gas desulfurization method, comprising the steps of:
   - a. cooling high temperature flue gas discharged by a ship engine into cooled flue gas by contact of the high temperature flue gas and seawater in gaps of fillings of a cooling layer in a housing; and
   - b. removing $SO_2$ from the cooled flue gas by contact of the cooled flue gas and the seawater in gaps of fillings of a scrubbing layer in the housing to produce clean flue gas;

wherein the seawater that cools the high temperature flue gas first passes through the scrubbing layer to absorb $SO_2$.

2. The ship flue gas desulfurization method according to claim 1, wherein the scrubbing layer is provided above the cooling layer.

3. The ship flue gas desulfurization method according to claim 1, wherein the scrubbing layer is adjacent to the cooling layer.

4. The ship flue gas desulfurization method according to claim 1, wherein seawater is arranged to flow along a liquid flow path on the surface of the fillings of the scrubbing layer and the cooling layer, while the high temperature flue gas is arranged to flow along a gas flow path in gaps of the seawater on the surface of the fillings of the scrubbing layer and the cooling layer.

5. The ship flue gas desulfurization method according to claim 1, wherein a temperature of the high temperature flue gas is 200-490° C.

6. The ship flue gas desulfurization method according to claim 5, wherein a temperature of the cleaned flue gas discharged from the outlet is 20-49° C.

7. The ship flue gas desulfurization method according to claim 1, wherein the cooling and the removing are carried out in two different functional sections in separate steps.

8. The ship flue gas desulfurization method according to claim 1, wherein the seawater comprises natural seawater.

* * * * *

UNITED STATES PATENT AND TRADEMARK OFFICE
CERTIFICATE OF CORRECTION

PATENT NO. : 9,757,686 B2
APPLICATION NO. : 13/958727
DATED : September 12, 2017
INVENTOR(S) : Sigan Peng It is certified that error appears in the above-identified patent and that said Letters Patent is hereby corrected as shown below:

On the Title Page

Delete "8 Claims" and insert --19 Claims--.

In the Claims

Column 14, Line 1: insert rejoined Claims 1-6, 11-14 and 18, renumbered as Claims 9 thru 19.
--9. A ship flue gas desulfurization apparatus for carrying out the ship flue gas desulfurization method of claim 1, the apparatus comprising a housing and, provided in the housing, a scrubbing layer for removing $SO_2$ from flue gas and a cooling layer for cooling high temperature flue gas, wherein both of the scrubbing layer and the cooling layer have fillings, and the housing has a gas flow path, which passes gaps of the fillings of the cooling layer firstly and then passes gaps of the fillings of the scrubbing layer, and a liquid flow path, which passes the gaps of the fillings of the scrubbing layer firstly and then pass the gaps of the fillings of the cooling layer.

10. The ship flue gas desulfurization apparatus according to claim 9, the scrubbing layer having fillings being fixed within the housing at an upper part of the housing, a liquid collecting pool with a seawater discharging outlet being provided within the housing at a lower part of the housing, a flue gas leading pipe for leading flue gas to be scrubbed from outside of the housing into inside of the housing, the flue gas leading pipe being connected to a wall of the housing, one end of the flue gas leading pipe comprising a flue gas inlet outside the housing, another end of the flue gas leading pipe comprising a flue gas leading-in port inside the housing, the flue gas leading-in port being located at an inner wall of the housing or extending into the housing, and being located between the scrubbing layer and the liquid collecting pool, a cooler for cooling high temperature flue gas being provided in a flue gas passage between the flue gas inlet outside the housing of the flue gas leading pipe and the scrubbing layer, the cooling layer having fillings provided between the gas leading-in port inside the housing and the scrubbing layer, a scrubbing seawater inlet being above the scrubbing layer, and a clean gas outlet being provided at a top of the housing.

Signed and Sealed this
Fifteenth Day of May, 2018

Andrei Iancu
*Director of the United States Patent and Trademark Office*

11. The ship flue gas desulfurization apparatus according to claim 10, wherein the fillings in the cooling layer comprise a high temperature resistant material.

12. The ship flue gas desulfurization apparatus according to claim 10, wherein the gas leading-in port inside the housing is an exit of the flue gas leading pipe fixed at a bottom of the housing and extending into the housing, and facing the exit is a liquid collecting cover for preventing scrubbing seawater from entering the flue gas leading pipe.

13. The ship flue gas desulfurization apparatus according to claim 10, wherein the gas leading-in port inside the housing is a through hole in a side wall of the housing, or an exit of the flue gas leading-in pipe fixedly connected to the side wall of the housing.

14. The ship flue gas desulfurization apparatus according to claim 12 wherein the liquid collecting pool is fixedly composed of a lower side wall of the housing, a bottom of the housing, and a pipe wall of the flue gas leading pipe or a separation plate outside the pipe wall.

15. The ship flue gas desulfurization apparatus according to claim 13, wherein the liquid collecting pool is composed of the side wall and a bottom of the housing under a horizontal cross section where a lower edge of the flue gas leading-in port inside the housing lies.

16. The ship flue gas desulfurization apparatus according to claim 10, wherein the fillings in the scrubbing layer comprises a polymer material.

17. The ship flue gas desulfurization apparatus according to claim 10, wherein a water distributor which outflows downwards scrubbing seawater in a horizontal and even distribution pattern is fixed above the scrubber layer, and the water distributor is composed of at least one of aligned water pipes and water channels.

18. The ship flue gas desulfurization apparatus according to claim 17, wherein a mist eliminator for eliminating mist drops in exhaust gas is installed above the water distributor.

19. The ship flue gas desulfurization method according to claim 1, further comprising:
    a. leading flue gas discharged by an engine of the ship into the housing in which the flue gas flows upwards; and
    b. injecting the seawater into the housing such that the seawater for cooling the high temperature flue gas and for removing $SO_2$ from the cooled flue gas flows downwards from a scrubbing seawater entrance located above the scrubbing layer.--.